UNITED STATES PATENT OFFICE.

AXEL RUDOLF LINDBLAD, OF LUDVIKA, SWEDEN.

PROCESS FOR PRODUCING SOLUBLE POTASSIUM OR SODIUM COMPOUNDS OUT OF FELDSPAR OR MICA OR THE LIKE.

1,083,287.　　　　Specification of Letters Patent.　Patented Jan. 6, 1914.

No Drawing.　　Application filed October 22, 1912.　Serial No. 727,155.

*To all whom it may concern:*

Be it known that I, AXEL RUDOLF LINDBLAD, subject of the King of Sweden, residing at Ludvika, Sweden, have invented certain new and useful Improvements in Processes for Producing Soluble Potassium or Sodium Compounds Out of Feldspar or Mica or the like, of which the following is a specification.

The numerous feldspar or mica deposits contain, as well known, a comparatively high percentage of potassium oxid, $K_2O$, or sodium oxid, $Na_2O$, or both the said compounds, and it should therefore be possible for them to become a valuable raw material for the manufacture of the potassium or sodium compounds, so important for the requirements both of agriculture and industry. The difficulty is to find some method available for industrial purposes for converting the potassium or sodium (in the sequel also called alkali compounds) contained in the feldspar or mica or the like rocks or minerals containing potassium- or sodium-aluminium silicates into a soluble form. However, no success has hitherto been met with in carrying out such a process economically. It is true that various proposals have been brought forward, but none of them have been available for industrial purposes.

The present invention relates to a process, whereby it will become commercially possible to turn to account the alkali compounds contained in the minerals in question, and, moreover, simultaneously to obtain several valuable by-products. The fundamental idea of the invention is that the raw material in question, feldspar or mica, or the mineral containing feldspar or mica, or the minerals containing insoluble silicates of potassium or sodium, be subjected in an electric furnace to a treatment by which the silicon dioxid $SiO_2$, contained in the material is entirely or partially removed (decomposed). Many different variations of the method in question may be used in practice. Thus, e. g. the silicon dioxid may be entirely or partially removed by reduction, eventually with the formation of carbid of silicon. As, however, owing to its lack of fusibility, it is difficult to separate the silicon carbid from the remaining product, the best method is no doubt to heat in the electric furnace the raw material (e. g. feldspar or mica) together with charcoal or other reducing agent and a metal having the property of forming an alloy with silicon, or a compound of such a metal, reducible in the furnace. Such metals are e. g. iron, copper, etc. Hereby is attained the advantage that the silicon removed by reduction can readily be separated from the product containing a smaller quantity of silicon dioxid than the raw material and intended for further treatment.

By way of illustration, a description is given below of the process, as it is carried out with the use of iron for the last-named purpose and potassium feldspar as raw material.

Feldspar, iron, or iron ore, together with charcoal are charged together and heated in the electric furnace. Hereby is removed by reduction a larger or smaller quantity of the silicon which forms an alloy with the iron, silicids of iron, which is collected as a valuable by-product. The properties of the remaining smelted product depend on how much silicon dioxid has been removed from the raw material.

A few extreme cases may here be given by way of illustration, it being assumed that pure potassium feldspar.

is used.

The process is first conceived to be carried out in such a manner that from the $6SiO_2$ occurring in the feldspar $2SiO_2$ is removed, or decomposed, whereupon there remains

This compound which in composition is analogous with alum, is identical with the mineral leucite occurring sparingly in nature, often in the vicinity of volcanoes. As the said salt easily weathers, and as it is soluble both in hydrochloric acid and in a number of other acids, it can (after being finely comminuted) be used as a manure in soil requiring potassium. The example here described, according to which such an amount of silicon dioxid is removed that the composition of the remaining product becomes analogous with leucite, is an extreme case. If less silicon dioxid is removed, there is not obtained any product soluble in water, hydrochloric acid, or humus acids. But this solubility is the fundamental condition for enabling the product to be used as a manure. It is evident that in this case also the process can be varied in different ways without departing from the fundamental idea of the invention. Thus, according to one's wishes and the circumstances of the case, a smaller quantity of silicon dioxid than that which is indicated in the above example, may be removed.

By the expression soluble compounds used in this specification and the following claims is meant compounds which are soluble in water, citric acids, hydrochloric acids and the like.

Having thus described my invention I declare that what I claim is:

1. A process of producing soluble potassium or sodium compounds out of materials containing alkali-aluminium-silicate, consisting in heating the said material in an electric furnace together with such materials which during said heating have the capacity to decompose the silicon dioxid, said heating being carried on until so much of the silicon dioxid being decomposed that soluble alkali-aluminium-silicates are formed.

2. A process of producing soluble potassium or sodium compounds out of materials containing alkali-aluminium-silicate, consisting in heating said material in an electric furnace together with such reducing materials, which during said heating have the capacity to decompose the silicon dioxid, said heating being carried on until so much of the silicon dioxid being decomposed that soluble alkali-aluminium-silicates are formed.

3. A process of producing soluble potassium or sodium compounds out of materials containing alkali-aluminium-silicate, consisting in heating the said material in an electric furnace together with carbon, said heating being carried on until so much of the silicon dioxid being decomposed that soluble alkali-aluminium-silicates are formed.

4. A process of producing soluble potassium or sodium compounds out of materials containing alkali-aluminium-silicate consisting in heating said material in an electric furnace together with such reducing material which during said heating has the capacity to decompose silicon dioxid contained in said material and a metal, which has the capacity to unite with the silicon thereby reduced, said heating being carried on until so much of the silicon dioxid being decomposed that soluble alkali-aluminium-silicates are formed.

5. A process of producing soluble potassium or sodium compounds out of materials containing alkali-aluminium-silicate, consisting in heating said material in an electric furnace together with such reducing material which during said heating has the capacity to decompose silicon dioxid contained in said material, and iron, the heating being carried on until so great a part of the silicon contained in the raw material has been reduced and combined with the iron to iron silicid that soluble alkali-aluminium-silicates are formed of the alkali contained in the raw material.

In witness whereof I have hereunto set my hand in presence of two witnesses.

AXEL RUDOLF LINDBLAD.

Witnesses:
 AUG. HAGELIN,
 GRETA PRIM.